W. E. STEWART.
TIRE-HEATER.
No. 192,198. Patented June 19, 1877.
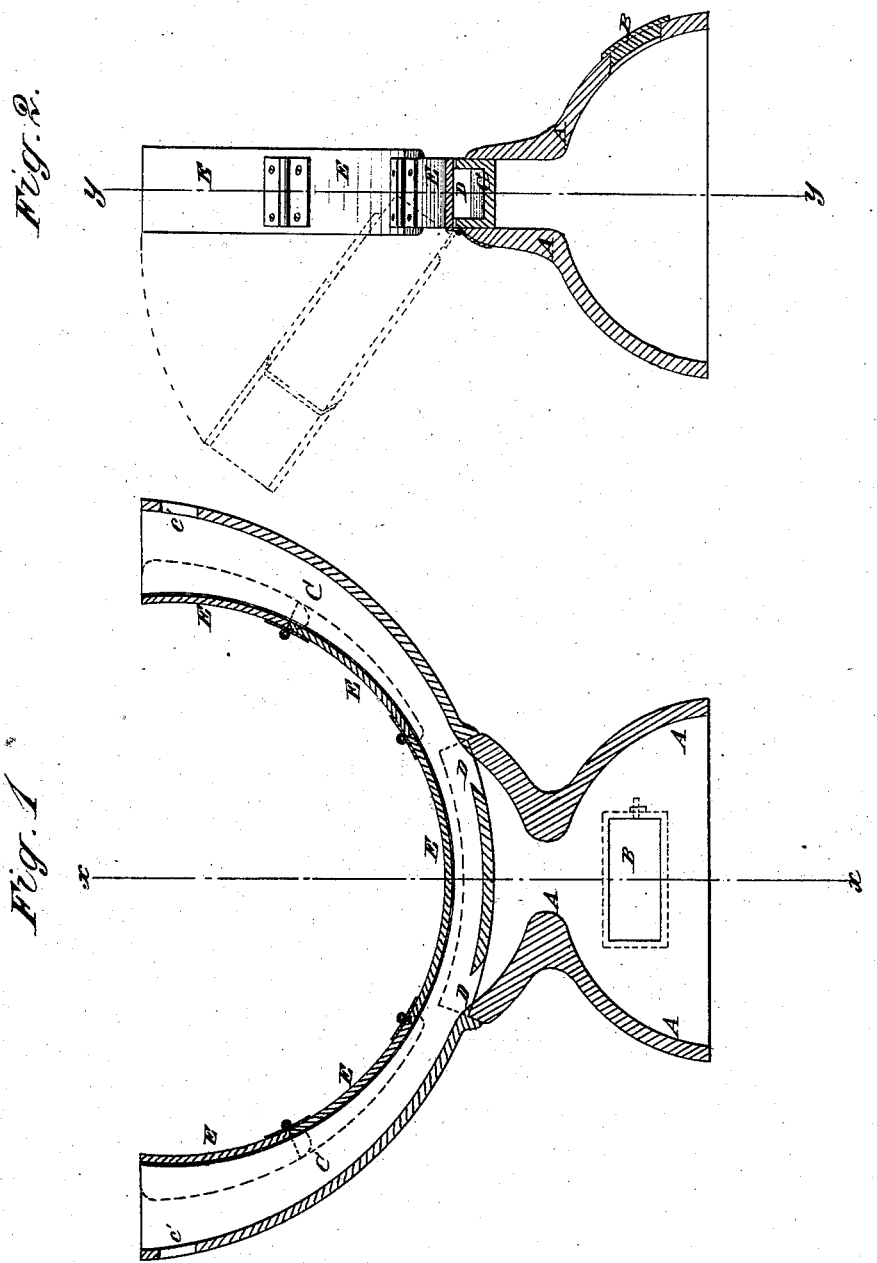
WITNESSES:
H. Rydquist
J. H. Scarborough
INVENTOR:
W. E. Stewart
BY Munn & Co
ATTORNEYS.

UNITED STATES PATENT OFFICE.

WILLIAM E. STEWART, OF XENIA, OHIO.

IMPROVEMENT IN TIRE-HEATERS.

Specification forming part of Letters Patent No. 192,198, dated June 19, 1877; application filed May 5, 1877.

*To all whom it may concern:*

Be it known that I, WILLIAM EDWARD STEWART, of Xenia, in the county of Greene and State of Ohio, have invented a new and useful Improvement in Tire-Heater, of which the following is a specification:

Figure 1 is a vertical longitudinal section of my improved device, taken through the line $y\ y$, Fig. 2. Fig. 2 is a vertical cross-section of the same, taken through the line $x\ x$, Fig. 1.

Similar letters of reference indicate corresponding parts.

The object of this invention is to furnish an improved device for heating tires and other curved irons, which shall be so constructed as to enable the tire to be heated quickly and with a small amount of fuel.

The invention consists in an improved tire-heater formed by the combination of the hollow base, the semi-ring trough provided with holes, and the cap, made in sections, hinged to each other, and having flanges formed upon their side edges, as hereinafter fully described.

A is the base of the heater, the lower part of which is made in the form of a half-sphere, and of such a size as to inclose an ordinary blacksmith's fire. The upper part of the base A is elongated laterally, and is concaved to form a seat for the semi-ring gutter or trough C, which is made of such a size as to hold two or more tires, and has two holes, D, formed in it at the ends of the elongated upper part of the base A, to allow the flame from the fire in said base to pass up into it. The lower part of the base has a hole formed in it to enable fuel to be put into it, and the fire to be stirred, which opening is closed with a door, B. The inner or concave side of the trough C is open, and is closed with a cap, E, which is made in sections hinged to each other, and with flanges upon their side edges to overlap the sides of the trough C. The lower section of the cap E is hinged at its middle part to the top edge of the base A. The flanges of the upper sections are deeper than those of the lower sections, so that the upper sections may be turned inward to accommodate a smaller tire.

To enable the tires to be put in and taken out, the upper sections are turned down upon each other and the lower section, and are then turned out upon the hinge of the said lower section.

In using the device, a single tire is placed in it, and one side is heated. The tire is then turned, a second tire is put in, and the lower sides of the two tires are heated. The first tire is then taken out and set, the second tire is turned, and a third tire is put in, and so on, one man being able to heat the tires as fast as two can set them.

Holes $c'$ are formed in the upper parts of the trough C, to enable it to be handled while hot with tongs, or with a rod passed through the said holes $c'$.

Having thus described my invention, I claim as new and desire to secure by Letters Patent—

An improved tire-heater formed by the combination of the hollow base A, the semi-ring trough C, provided with the holes D, and the cap E, made in sections, hinged to each other, and having flanges formed upon their side edges, substantially as herein shown and described.

WILLIAM EDWARD STEWART.

Witnesses:
    JOHN A. HIVLING,
    ALBERT STRATTON.